United States Patent
Zhang

(10) Patent No.: US 12,340,021 B2
(45) Date of Patent: Jun. 24, 2025

(54) METHOD AND DEVICE FOR SYNCHRONIZING HAPTIC FEEDBACK AND VISUAL FEEDBACK

(71) Applicants: Beijing BOE Technology Development Co., Ltd., Beijing (CN); BOE Technology Group Co., Ltd., Beijing (CN)

(72) Inventor: Hengfei Zhang, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/021,541

(22) PCT Filed: Mar. 9, 2022

(86) PCT No.: PCT/CN2022/079893
§ 371 (c)(1),
(2) Date: Feb. 15, 2023

(87) PCT Pub. No.: WO2023/168621
PCT Pub. Date: Sep. 14, 2023

(65) Prior Publication Data
US 2024/0272717 A1   Aug. 15, 2024

(51) Int. Cl.
*G06F 3/01* (2006.01)
*G06F 3/041* (2006.01)
(Continued)

(52) U.S. Cl.
CPC .......... *G06F 3/016* (2013.01); *G06F 3/04166* (2019.05); *G06F 3/04845* (2013.01);
(Continued)

(58) Field of Classification Search
None
See application file for complete search history.

(56) References Cited

U.S. PATENT DOCUMENTS

| 11,435,830 B2* | 9/2022 | Moussette ........... G06F 3/04817 |
| 2006/0026535 A1* | 2/2006 | Hotelling .............. G06F 3/0488 |
| | | 715/863 |

(Continued)

FOREIGN PATENT DOCUMENTS

| CN | 109254658 A | 1/2019 |
| CN | 211236872 U | 8/2020 |
| WO | 2018048518 A1 | 3/2018 |

*Primary Examiner* — Matthew Yeung
(74) *Attorney, Agent, or Firm* — IPro, PLLC

(57) ABSTRACT

Provides are a method and device for synchronizing haptic feedback and visual feedback, so as to synchronize the haptic feedback accompanying a touch operation of a user and the visual feedback. The method includes: acquiring a tangential speed of rotation of a contact, the contact is generated when a user executes a touch operation of rotation within a coverage range of a virtual knob displayed on a touch screen, the touch operation being accompanied by haptic feedback; controlling response labels displayed on the touch screen to move in sequence according to the tangential speed to synchronize the haptic feedback and visual feedback formed by moving response labels, a step length of movement of each response label corresponds to a preset unit angle, and the number of movements of each response label is determined according to the number of preset unit angles encompassed in a rotation angle of the virtual knob.

15 Claims, 9 Drawing Sheets

(51) Int. Cl.
*G06F 3/04845* (2022.01)
*G06F 3/04847* (2022.01)
*G06F 3/04886* (2022.01)

(52) U.S. Cl.
CPC ...... *G06F 3/04847* (2013.01); *G06F 3/04886* (2013.01); *G06F 2203/04803* (2013.01)

(56) References Cited

U.S. PATENT DOCUMENTS

| | | | |
|---|---|---|---|
| 2008/0079972 A1* | 4/2008 | Goodwin | G06F 3/0485 358/1.15 |
| 2013/0016042 A1 | 1/2013 | Makinen et al. | |
| 2013/0345883 A1* | 12/2013 | Sloo | G05B 15/02 700/276 |
| 2016/0124591 A1* | 5/2016 | Hisatsugu | G06F 3/0482 715/830 |

* cited by examiner

METHOD AND DEVICE FOR SYNCHRONIZING HAPTIC FEEDBACK AND VISUAL FEEDBACK

CROSS-REFERENCE TO RELATED APPLICATIONS

This application is a National Stage of International Application No. PCT/CN2022/079893, filed Mar. 9, 2022, which is hereby incorporated by reference in its entirety.

FIELD

The present disclosure relates to the technical field of human-computer interaction, and in particular to a method and device for synchronizing haptic feedback and visual feedback.

BACKGROUND

In the technical field of human-computer interaction, a user implements human-computer interaction with an electronic device through a touch operation executed on a touch screen. After the user performs the touch operation on the touch screen of the electronic device, the electronic device provides visual feedback corresponding to the touch operation for the user by displaying an interface corresponding to the touch operation. Generally, after the user executes the touch operation, the corresponding interface will be displayed only after a certain period of feedback time. It is likely to cause desynchronization between the touch operation and the visual feedback when the user executes the touch operation rapidly.

SUMMARY

In a first aspect, an embodiment of the present disclosure provides a method for synchronizing haptic feedback and visual feedback. The method includes: acquiring a tangential speed of rotation of a contact, where the contact is generated when a user executes a touch operation of rotation within a coverage range of a virtual knob displayed on a touch screen, the touch operation being accompanied by haptic feedback; and controlling all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

As an optional implementation mode, the method further includes: determining a visual feedback time for moving a target response label to a reference position according to the tangential speed, where the target response label is determined according to a response label displayed on the reference position before all the response labels are moved in sequence and the number of movements of each response label; and in response to determining that the visual feedback time is less than or equal to a time threshold, updating a content of each response label displayed on the touch screen.

As an optional implementation mode, the controlling all response labels displayed on the touch screen to move in sequence according to the tangential speed includes: in response to determining that the visual feedback time is greater than the time threshold, controlling all the response labels displayed on the touch screen to move in sequence according to the tangential speed, where the target response label is controlled to move to the reference position.

As an optional implementation mode, the determining a visual feedback time for moving a target response label to a reference position according to the tangential speed includes: determining the rotation angle of the virtual knob according to the tangential speed and a size of the virtual knob; and determining the visual feedback time for moving the target response label to the reference position according to a distance between the target response label and the reference position and the rotation angle.

As an optional implementation mode, the controlling all response labels displayed on the touch screen to move in sequence according to the tangential speed includes: determining a movement track of each response label according to the step length and the number of movements of each response label; and executing the following steps for the movement track of each response label: performing an interpolation operation on the movement track of the response label to obtain all point positions passed by the response label in a movement process; and controlling the response label to move to all the point positions in sequence according to the tangential speed.

As an optional implementation mode, the controlling all response labels displayed on the touch screen to move in sequence according to the tangential speed includes: taking the tangential speed as a movement speed to control all the response labels displayed on the touch screen to move in sequence at a uniform speed.

As an optional implementation mode, the controlling all response labels displayed on the touch screen to move in sequence according to the tangential speed includes: acquiring a rotation direction of the contact, and determining a movement direction of each response label displayed on the touch screen according to the rotation direction; and controlling all the response labels displayed on the touch screen to move in sequence according to the tangential speed and the movement direction.

As an optional implementation mode, all the response labels are arranged and displayed in sequence in a longitudinal direction; alternatively, all the response labels are arranged and displayed in sequence in a horizontal direction; and alternatively, all the response labels are arranged and displayed around the virtual knob.

In a second aspect, an embodiment of the present disclosure provides an apparatus for synchronizing haptic feedback and visual feedback. The apparatus includes: a speed acquisition unit configured to acquire a tangential speed of rotation of a contact, where the contact is generated when a user executes a touch operation of rotation within a coverage range of a virtual knob displayed on a touch screen, the touch operation being accompanied by haptic feedback; and a movement control unit configured to control all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

As an optional implementation mode, the apparatus further includes a content update unit configured to: determine a visual feedback time for moving a target response label to a reference position according to the tangential speed, where the target response label is determined according to a response label displayed on the reference position before all the response labels are moved in sequence and the number of movements of each response label; and in response to determining that the visual feedback time is less than or equal to a time threshold, update a content of each response label displayed on the touch screen.

As an optional implementation mode, the movement control unit is specifically configured to: in response to determining that the visual feedback time is greater than the time threshold, control all the response labels displayed on the touch screen to move in sequence according to the tangential speed, where the target response label is controlled to move to the reference position.

As an optional implementation mode, the content update unit is configured to: determine the rotation angle of the virtual knob according to the tangential speed and a size of the virtual knob; and determine the visual feedback time for moving the target response label to the reference position according to a distance between the target response label and the reference position and the rotation angle.

As an optional implementation mode, the movement control unit is specifically configured to: determine a movement track of each response label according to the step length and the number of movements of each response label; and execute the following steps for the movement track of each response label: performing an interpolation operation on the movement track of the response label to obtain all point positions passed by the response label in a movement process; and controlling the response label to move to all the point positions in sequence according to the tangential speed.

As an optional implementation mode, the movement control unit is specifically configured to: take the tangential speed as a movement speed to control all the response labels displayed on the touch screen to move in sequence at a uniform speed.

As an optional implementation mode, the movement control unit is specifically configured to: acquire a rotation direction of the contact, and determining a movement direction of each response label displayed on the touch screen according to the rotation direction; and control all the response labels displayed on the touch screen to move in sequence according to the tangential speed and the movement direction.

As an optional implementation mode, all the response labels are arranged and displayed in sequence in a longitudinal direction; alternatively, all the response labels are arranged and displayed in sequence in a horizontal direction; and alternatively, all the response labels are arranged and displayed around the virtual knob.

In a third aspect, an embodiment of the present disclosure provides a device for synchronizing haptic feedback and visual feedback. The device includes a processor and a memory, where the memory is configured to store a program executable by the processor, and the processor is configured to read the program from the memory and execute the following steps: acquiring a tangential speed of rotation of a contact, where the contact is generated when a user executes a touch operation of rotation within a coverage range of a virtual knob displayed on a touch screen, the touch operation being accompanied by haptic feedback; and controlling all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

As an optional implementation mode, the processor is further specifically configured to execute: determining a visual feedback time for moving a target response label to a reference position according to the tangential speed, where the target response label is determined according to a response label displayed on the reference position before all the response labels are moved in sequence and the number of movements of each response label; and in response to determining that the visual feedback time is less than or equal to a time threshold, updating a content of each response label displayed on the touch screen.

As an optional implementation mode, the processor is specifically configured to execute: in response to determining that the visual feedback time is greater than the time threshold, controlling all the response labels displayed on the touch screen to move in sequence according to the tangential speed, where the target response label is controlled to move to the reference position.

As an optional implementation mode, the processor is specifically configured to executing: determining the rotation angle of the virtual knob according to the tangential speed and a size of the virtual knob; and determining the visual feedback time for moving the target response label to the reference position according to a distance between the target response label and the reference position and the rotation angle.

As an optional implementation mode, the processor is specifically configured to execute: determining a movement track of each response label according to the step length and the number of movements of each response label; and executing the following steps for the movement track of each response label: performing an interpolation operation on the movement track of the response label to obtain all point positions passed by the response label in a movement process; and controlling the response label to move to all the point positions in sequence according to the tangential speed.

As an optional implementation mode, the processor is specifically configured to execute: taking the tangential speed as a movement speed to control all the response labels displayed on the touch screen to move in sequence at a uniform speed.

As an optional implementation mode, the processor is specifically configured to execute: acquiring a rotation direction of the contact, and determining a movement direction of each response label displayed on the touch screen according to the rotation direction; and controlling all the response labels displayed on the touch screen to move in sequence according to the tangential speed and the movement direction.

As an optional implementation mode, all the response labels are arranged and displayed in sequence in a longitudinal direction; alternatively, all the response labels are arranged and displayed in sequence in a horizontal direction; and alternatively, all the response labels are arranged and displayed around the virtual knob.

In a fourth aspect, an embodiment of the present disclosure further provides a computer storage medium, storing a computer program, where the program is configured to implementing steps of the method in the first aspect described above when executed by a processor.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description are merely some embodiments of the present disclosure, and those of ordinary skill in the art can also derive other accompanying drawings from these accompanying drawings without making creative efforts.

DETAILED DESCRIPTION OF THE EMBODIMENTS

Figure 1:
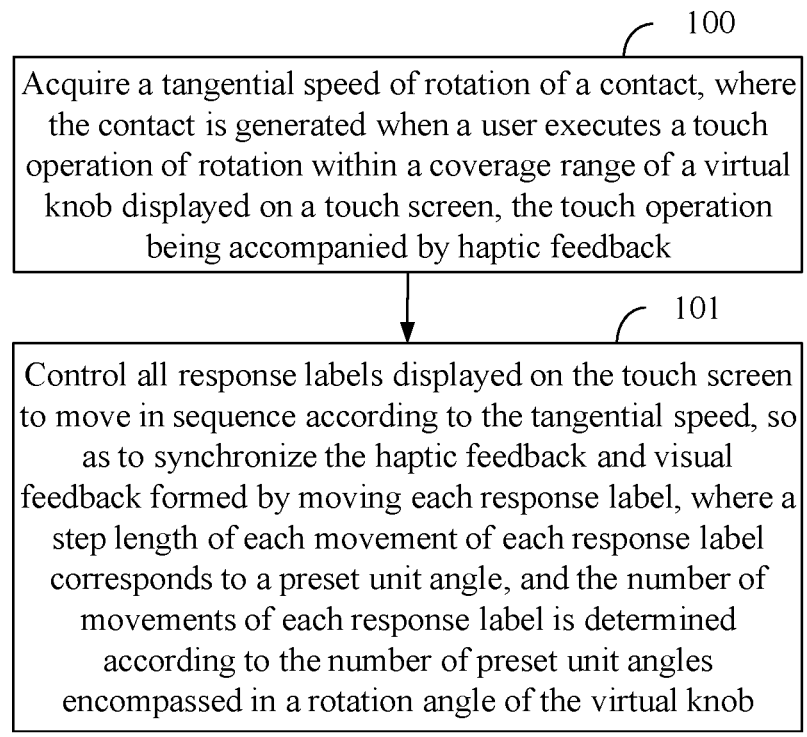
FIG. 1 is an implementation flowchart of a method for synchronizing haptic feedback and visual feedback according to an embodiment of the present disclosure.

In order to make the objectives, technical solutions, and advantages of the present disclosure clearer, the present disclosure will be further described in detail below in conjunction with the accompanying drawings. Obviously, the described embodiments are some embodiments rather than all embodiments of the present disclosure. Based on the embodiments of the present disclosure, all other embodiments obtained by those of ordinary skill in the art without making creative efforts fall within the scope of protection of the present disclosure.

In the embodiments of the present disclosure, the term "and/or", which describes an association relation of associated objects, indicates that there may be three relations, for example, A and/or B may indicate three situations: A exists alone, both A and B exist, and B exists alone. The character "/" generally indicates that successive association objects are in an "or" relation.

The application scenarios described in the embodiments of the present disclosure are intended to describe the technical solutions in the embodiments of the present disclosure more clearly, and do not limit the technical solutions in the embodiments of the present disclosure. Those of ordinary skill in the art can know that with new application scenarios occurring, the technical solutions in the embodiments of the present disclosure are also applicable to similar technical problems. In the description of the present disclosure, the term "a plurality of" means two or more unless otherwise specified.

Embodiment 1, in the technical field of human-computer interaction, a user implements human-computer interaction with an electronic device through a touch operation executed on a touch screen. After the user performs the touch operation on the touch screen of the electronic device, the electronic device provides visual feedback corresponding to the touch operation for the user by displaying an interface corresponding to the touch operation. Generally, after the user executes the touch operation, the corresponding interface will be displayed only after a certain period of feedback time. It is likely to cause desynchronization between the touch operation and the visual feedback when the user executes the touch operation rapidly. For example, in some scenario, the user is required to control a virtual knob to rotate on the touch screen, so as to switch a current state of a controlled variable on the virtual knob. However, when the user rotates the virtual knob rapidly to switch the state, since a feedback time of state switching is generally fixed, it is impossible to synchronously switch the state upon rotation of the virtual knob, bringing delayed and asynchronous visual feedback and a stuttered visual experience to the user.

In order to solve the technical problem described above, an embodiment of the present disclosure provides a method for synchronizing haptic feedback and visual feedback. According to the core idea, a tangential speed of rotation of a contact is acquired by measuring a speed of the contact, so as to control all response labels corresponding to a virtual knob to move in sequence according to the tangential speed. A movement speed of each response label changes with the change of the speed of the contact, so as to solve the problem that when a rotation speed of the virtual knob controlled by different users is variable, the haptic feedback and dynamic visual feedback are not synchronized or stuttered. In the present embodiment, a movement speed of the contact of a touch screen is measured to adjust the dynamic visual feedback at a variable speed, thereby reducing a delay in visual feedback and avoiding a stutter. Therefore, the haptic feedback accompanying a touch operation of the user and the dynamic visual feedback generated in response to the touch operation are synchronized, thereby effectively improving the experience of the user.

As shown in FIG. 1, an implementation flow of the method for synchronizing haptic feedback and visual feedback according to the present embodiment is as follows:

step 100, a tangential speed of rotation of a contact is acquired, where the contact is generated when a user executes a touch operation of rotation within a coverage range of a virtual knob displayed on a touch screen, the touch operation being accompanied by haptic feedback.

Figure 2:
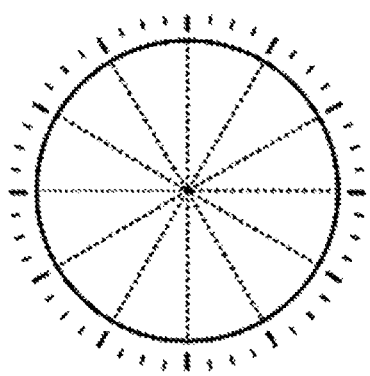
FIG. 2 is a schematic diagram of a virtual knob according to an embodiment of the present disclosure.

During implementation, the user may execute the touch operation along the virtual knob to simulate a rotation operation, on a physical knob, of the user in a real scenario. FIG. 2 is a schematic diagram of a virtual knob according to the present embodiment. When the user executes the touch operation of rotation on the virtual knob displayed on the touch screen, accompanied by the haptic feedback, for example, vibrating and shaking, the user has a haptic perception during rotation of the virtual knob. Therefore, a haptic sense generated when the user operates the physical knob in an actual real scenario may be more truly simulated.

In some embodiments, rotation of the contact is determined in the case of detecting a change in angle, within the coverage range of the virtual knob, of the contact, and the tangential speed generated when the contact rotates along the virtual knob is detected. The tangential speed in the present embodiment refers to an instantaneous speed of the contact when performing a curved motion (including a circular motion). Moreover, a motion direction of the contact is in a tangential direction of a motion track (such as a contour of the virtual knob).

In some embodiments, through sensors, whether the contact rotates may be detected, and the tangential speed of rotation of the contact may be measured. During implementation, the rotation of the contact generated through the touch operation of the user is not required to be performed along the circumference of the virtual knob strictly. As long as the contact is within the coverage range of the virtual knob and the angle change of the contact is greater than or equal to an angle threshold, it is determined that the contact performs the rotation operation on the virtual knob, and the contact is used as a valid contact, so as to measure the tangential speed of rotation of the contact. Similarly, if the contact is out of the coverage range of the virtual knob or the angle change of the contact is less than the angle threshold, it is determined that the contact is an invalid contact, and the steps described above are not executed.

Step 101, all response labels displayed on the touch screen are controlled to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

In some embodiments, the haptic feedback perceived by the user during rotation of the virtual knob is almost synchronous with a rotation process operated by the user. In order to synchronize the movement of the response label visually perceived by the user with the haptic feedback, in the present embodiment, each response label is controlled to move based on the tangential speed of rotation of the contact generated through the touch operation of the user, so that a movement process of the contact is synchronous with a movement process of the response label, and the contact is accompanied by the haptic feedback in the movement process. Therefore, the haptic feedback and the visual feedback may be synchronized, and the use experience of the user is improved.

In some embodiments, the virtual knob is marked with all rotation angles. Optionally, all the rotation angles may be uniformly distributed or not. The distribution of all the rotation angles on the virtual knob is not limited excessively in the present embodiment. The preset unit angle is not changed, so that the step length of each movement of each response label is fixed, and the number of movements is determined according to the number of the preset unit angles encompassed in the rotation angle. For example, if the preset unit angle is 10 degrees and the rotation angle is 50 degrees, each response label is moved by 5 step lengths. In some embodiments, after the rotation angle of the virtual knob is measured, the number of the preset unit angles encompassed in the rotation angle is determined firstly. The number of movements of the response label is determined according to the number of preset unit angles. Then the step length of movement of the response label corresponding to the preset unit angles is determined. Finally, all the response labels are controlled to move in sequence in a preset arrangement order according to the step length and the number of movements. It should be noted that the preset unit angle in the present embodiment is obtained by equally dividing a maximum angle of the virtual knob, and may be defined according to the actual situation, which is not limited excessively in the present embodiment.

Optionally, the preset unit angle is configured to representing measurement accuracy when measuring the rotation angle of the virtual knob. When the rotation angle obtained after the user rotates the virtual knob is less than the preset unit angle, it is determined that the rotation angle is invalid, and it is not to control the response label to move.

In some embodiments, the tangential speed may be used as a movement speed of each response label. Each response label displayed is controlled to move to a corresponding position according to the tangential speed. Visually, the movement speed of each response label changes with the change of the speed of the contact operated by the user. That is, if the contact operated by the user has a high speed, each response label has a high movement speed. If the contact operated by the user has a low speed, each response label has a low movement speed, thereby realizing visual feedback synchronization.

In some embodiments, the present embodiment further provides a method for switching a response label. Specific implementation steps are as follows:

step 1) a visual feedback time for moving a target response label to a reference position is determined according to the tangential speed.

The target response label is determined according to a response label displayed on the reference position before all the response labels are moved in sequence and the number movement of each response label. Optionally, an arrangement order of displaying all the response labels is predefined. Each response label is moved one or more times at a fixed step length, and a position of the response label changes once upon each movement. In some embodiments, the step length of all the response labels is the same, and all the response labels are moved simultaneously at the same step length for the same number of movements. When any one response label is moved by one step length, it is moved to an adjacent position (for example, a next adjacent position, or a previous adjacent position, or a left adjacent position, or a right adjacent position, and so on) in a predefined arrangement order.

In some embodiments, the target response label is determined according to the arrangement order of all the response labels, the response label displayed on the reference position before all the response labels are moved in sequence, and the number of movements of each response label. During implementation, the arrangement order of all the response labels is predefined. After the number of movements is determined, which response label will be moved to the reference position is determined according to the response labels displayed on the reference position and the number of movements. Therefore, the response label is determined as the target response label, that is, the response label selected by the user upon rotation of the virtual knob is determined.

In some embodiments, the reference position is configured to displaying the target response label. In some embodiments, the reference position is a fixed position on the touch screen for displaying the response label selected by the user currently, that is, the target response label.

Optionally, the target response label is a response label selected by the user upon rotation of the virtual knob and corresponds to the rotated virtual knob. The target response label is determined according to the response label displayed on the reference position before all the response labels are moved in sequence, and the number and a direction of movement of each response label. The arrangement order of all the response labels is predefined, and in a movement process, the response labels are moved in the arrangement order according to the step length, the number, and the direction of movement.

Optionally, the target response label in present embodiments may be regarded as a current response label. If the user has not rotated the virtual knob at the moment, the target response label may be regarded as a response label having been displayed on the reference position. If the user has rotated the virtual knob at the moment, the target response label is the response label corresponding to the rotation angle of the rotated virtual knob.

Some embodiments determines the visual feedback time for moving the target response label to the reference position through the following steps:

1a) the rotation angle of the virtual knob is determined according to the tangential speed and the size of the virtual knob.

In some embodiments, the rotation angle is determined according to the tangential speed and a radius of the virtual knob through a formula as follows:

$$w = v/R, \qquad \text{formula (1)}$$

where w denotes the rotation angle, v denotes the tangential speed, and R denotes the radius.

1b) the visual feedback time for moving the target response label to the reference position is determined according to a distance between the target response label and the reference position and the rotation angle.

In some embodiments, the visual feedback time is determined through a formula as follows:

$$t = L/\mu w, \qquad \text{formula (2)}$$

where t denotes the visual feedback time, L denotes the distance between the target response label and the reference position, w denotes the rotation angle, and μ denotes a correction coefficient greater than 0.

Step 2) in response to determining that the visual feedback time is less than or equal to a time threshold, a content of each response label displayed on the touch screen is updated.

The above formula shows that when L is constant, the greater w is, and the smaller t is. When w is increased to a certain extent, that is, when the user rotates the virtual knob at an extremely high speed, t tends to 0. In such a condition, due to the limitation of a computer processing capacity, if the dynamic visual feedback continues to be performed by moving the response label, asynchronous phenomena such as a picture stutter will be caused. In such a condition, the dynamic visual feedback is adjusted to static visual feedback, that is, no dynamic movement effect is generated visually, and the content of each response label is directly modified. Therefore, the visual feeling that the response label is moved to an exact position in one step is generated, so that the stutter is avoided, and the user experiences the human-computer interaction.

During implementation, when the user rotates the virtual knob to a certain angle, a target response label corresponding to the angle is displayed on the reference position. Moreover, in the period of time when the user rotates the virtual knob, since the visual feedback time is calculated to be short, there is almost no time for the response label to move to simulate the physical displacement in the real world, so that the content rather than the position of the response label is changed. Therefore, the visual feeling that the response label is moved to the exact position in one step is generated, the visual feedback and the haptic feedback are synchronized, and a haptic perception and a visual perception of the user are synchronized.

In some embodiments, in response to determining that the visual feedback time is greater than the time threshold, all the response labels displayed on the touch screen are controlled to move in sequence according to the tangential speed, where the target response label is controlled to move to the reference position.

During implementation, in the period of time when the user rotates the virtual knob, due to a long feedback time, there is sufficient time for the response label to move to simulate the physical displacement in the real world, the target response label is moved to the reference position, and other response labels are also moved to corresponding positions in sequence in a movement process of the target response label. Through the displacement of the response label, the user feels that the response label has the physical change in the real world visually.

In some embodiments, the virtual knob is rotated along with the rotation of the contact.

Some embodiments provide two visual feedback modes, including the dynamic visual feedback and the static visual feedback. The two visual feedback modes according to the present embodiment are explained as follows.

The static visual feedback means that when the user rotates the virtual knob on the touch screen, only the content change rather than the displacement change of the response label is generated when switching the response label. During implementation, in response to determining that the visual feedback time is less than or equal to the time threshold, the content of each response label displayed on the touch screen is updated.

The dynamic visual feedback means that when the user rotates the virtual knob on the touch screen, the displacement change is generated when switching the response label, and visually, the content of the response label is changed in the same mode as the physical change process in the real world. During implementation, in response to determining that the visual feedback time is greater than the time threshold, all the response labels displayed on the touch screen are controlled to move in sequence according to the tangential speed, where the target response label is controlled to move to the reference position.

In some embodiments, the embodiment of the present disclosure may further determine whether to use the dynamic visual feedback or the static visual feedback based on the determination on the tangential speed. A specific implementation flow is as follows.

When the tangential speed is greater than a speed threshold, the response label is switched through the static visual feedback, that is, the content of each response label displayed on the touch screen is updated.

When the tangential speed is less than or equal to the speed threshold, the response label is switched through the dynamic visual feedback, that is, all the response labels displayed on the touch screen are controlled to move in sequence according to the tangential speed, where the target response label is controlled to move to the reference position.

In some embodiments, the reference position in the present embodiment is a fixed display position on the touch screen for displaying a response label corresponding to a current rotation angle of the virtual knob. The setting of the reference position is not limited excessively in the present embodiment.

In some embodiments, the present embodiment provides an interpolation method. Therefore, the response label may simulate a more real physical movement scenario in the movement process. A specific implementation mode is as follows:

a movement track of each response label is determined according to the step length and the number of movements of each response label; and the following steps are executed for the movement track of each response label:

an interpolation operation is performed on the movement track of the response label to obtain all point positions passed by the response label in a movement process; and the response label is controlled to move to all the point positions in sequence according to the tangential speed.

Some embodiments may also take the tangential speed as a movement speed to control each response label displayed on the touch screen to move in sequence at a uniform speed.

During implementation, each response label is controlled to move to all the point positions in sequence at a uniform speed according to the tangential speed.

Some embodiments may also control the movement direction of each response label according to the rotation direction of the contact. A specific implementation is as follows.

A rotation direction of the contact is acquired, and a movement direction of each response label displayed on the touch screen is determined according to the rotation direction; and all the response labels displayed on the touch screen are controlled to move in sequence according to the tangential speed and the movement direction.

During implementation, the tangential speed is used as the movement speed of each response label, and each response label is controlled to move to a corresponding position (each point position) according to the movement direction of the response label corresponding to the movement direction. Optionally, the user controls the virtual knob to rotate through the touch screen, so as to make the response label move vertically, thereby switching the position. When the virtual knob is rotated clockwise, all the response labels are moved from top to bottom to switch positions. When the virtual knob is rotated counterclockwise, all the response labels are moved from bottom to top to switch the positions. Alternatively, the user controls the virtual knob to rotate through the touch screen, so as to make the response label move horizontally. When the virtual knob is rotated clockwise, all the response labels are moved from left to right to switch positions. When the virtual knob is rotated counterclockwise, all the response labels are moved from right to left to switch positions. Alternatively, the user controls the virtual knob to rotate through the touch screen, so as to make the response label move obliquely. When the virtual knob is rotated clockwise, all the response labels are moved from bottom to top diagonally to switch positions. When the virtual knob is rotated counterclockwise, all the response labels are moved from top to bottom diagonally to switch positions.

In some embodiments, any one of the following is employed as a display mode of each response label displayed on the touch screen in the present embodiment:

(1) all the response labels are arranged and displayed in sequence in a longitudinal direction;

(2) all the response labels are arranged and displayed in sequence in a horizontal direction; and (3) all the response labels are arranged and displayed around the virtual knob. All the response labels may surround one side of the virtual knob, or an entire virtual knob, for example, the response labels may be uniformly distributed around the virtual knob, which is not limited excessively in the present embodiment.

In some embodiments, both the virtual knob and the response label are displayed on the touch screen, and the virtual knob and the response label are not shielded from each other. The relative position relation between the virtual knob and the response label is not limited excessively in the present embodiment.

In some embodiments, the shapes of the virtual knob in the present embodiment include, but are not limited to, at least one of a circle, an ellipse, and a graph composed of curves, which is not limited excessively in the present embodiment.

In some embodiments, the response labels include, but are not limited to, an icon, a picture, and a text, and the contents of the response label include, but are not limited to, specified information, such as a contact of an address book, a song list of a song library, a product model, etc. The size, shape, content, color, etc. of the response label are not limited excessively in the present embodiment.

In some embodiments, some response labels rather than all the response labels may be displayed on the touch screen at the same time. The target response label corresponding to the current rotation angle of the virtual knob is displayed on the reference position, and the response labels may also be displayed in sequence in a scrolling mode when the user rotates the virtual knob.

Figure 3:
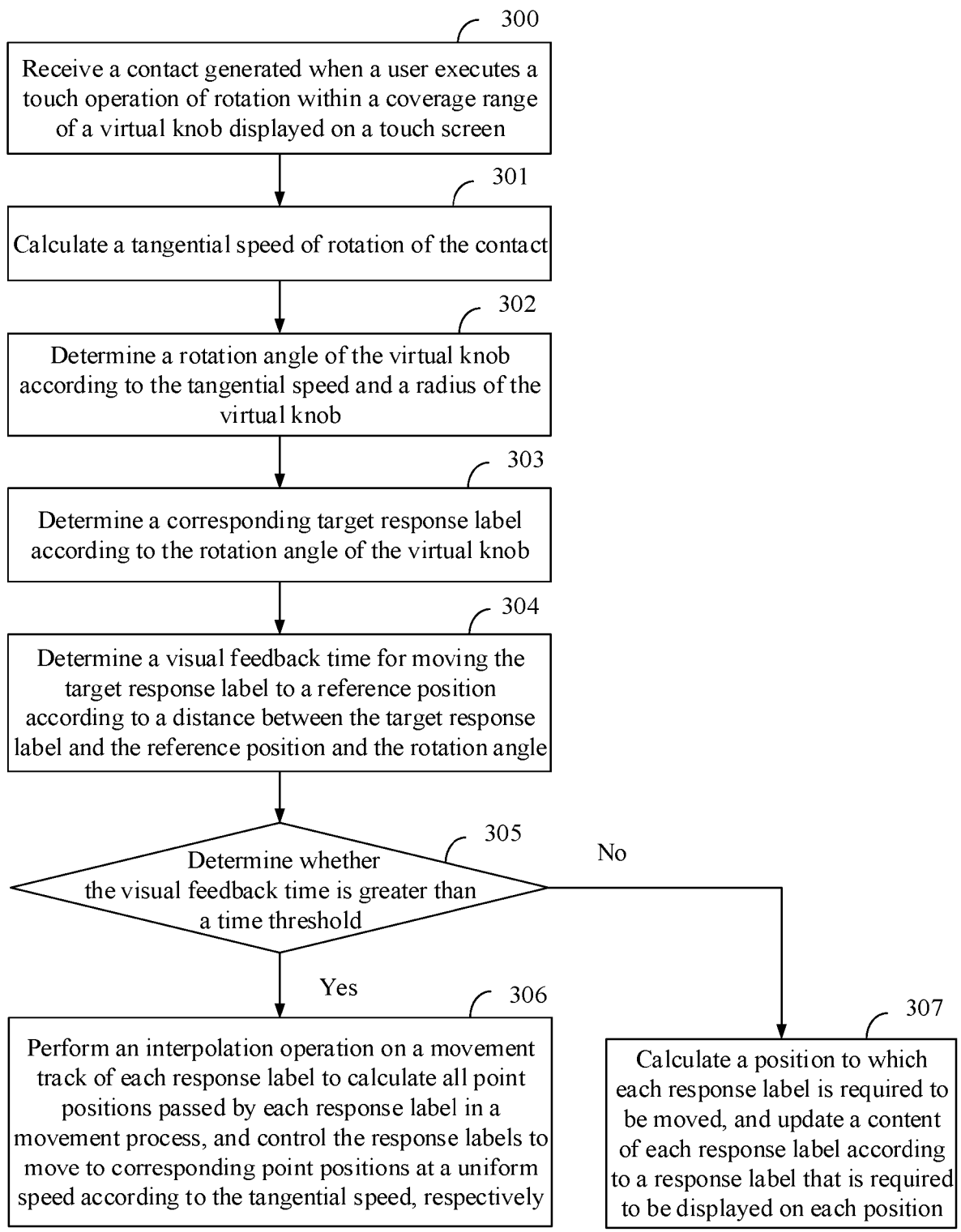
FIG. 3 is a specific implementation flowchart of synchronizing haptic feedback and visual feedback according to an embodiment of the present disclosure.

As shown in FIG. 3, an embodiment of the present disclosure further provides a specific implementation flow of synchronizing haptic feedback and visual feedback, as shown below.

Step 300, a contact generated when a user executes a touch operation of rotation within a coverage range of a virtual knob displayed on a touch screen is received.

Step 301, a tangential speed of rotation of the contact is calculated.

Step 302, a rotation angle of the virtual knob is determined according to the tangential speed and a radius of the virtual knob.

Step 303, a corresponding target response label is determined according to the rotation angle of the virtual knob.

Step 304, a visual feedback time for moving the target response label to a reference position is determined according to a distance between the target response label and the reference position and the rotation angle.

Step 305, whether the visual feedback time is greater than a time threshold is determined, and if yes, step 306 is executed, otherwise step 307 is executed.

Step 306, an interpolation operation is performed on a movement track of each response label to calculate all point positions passed by each response label in a movement process, and the response labels are controlled to move to corresponding point positions at a uniform speed according to the tangential speed, respectively.

Step 307, a position to which each response label is required to be moved is calculated, and a content of each response label is updated according to a response label that is required to be displayed on each position.

Figure 4A:
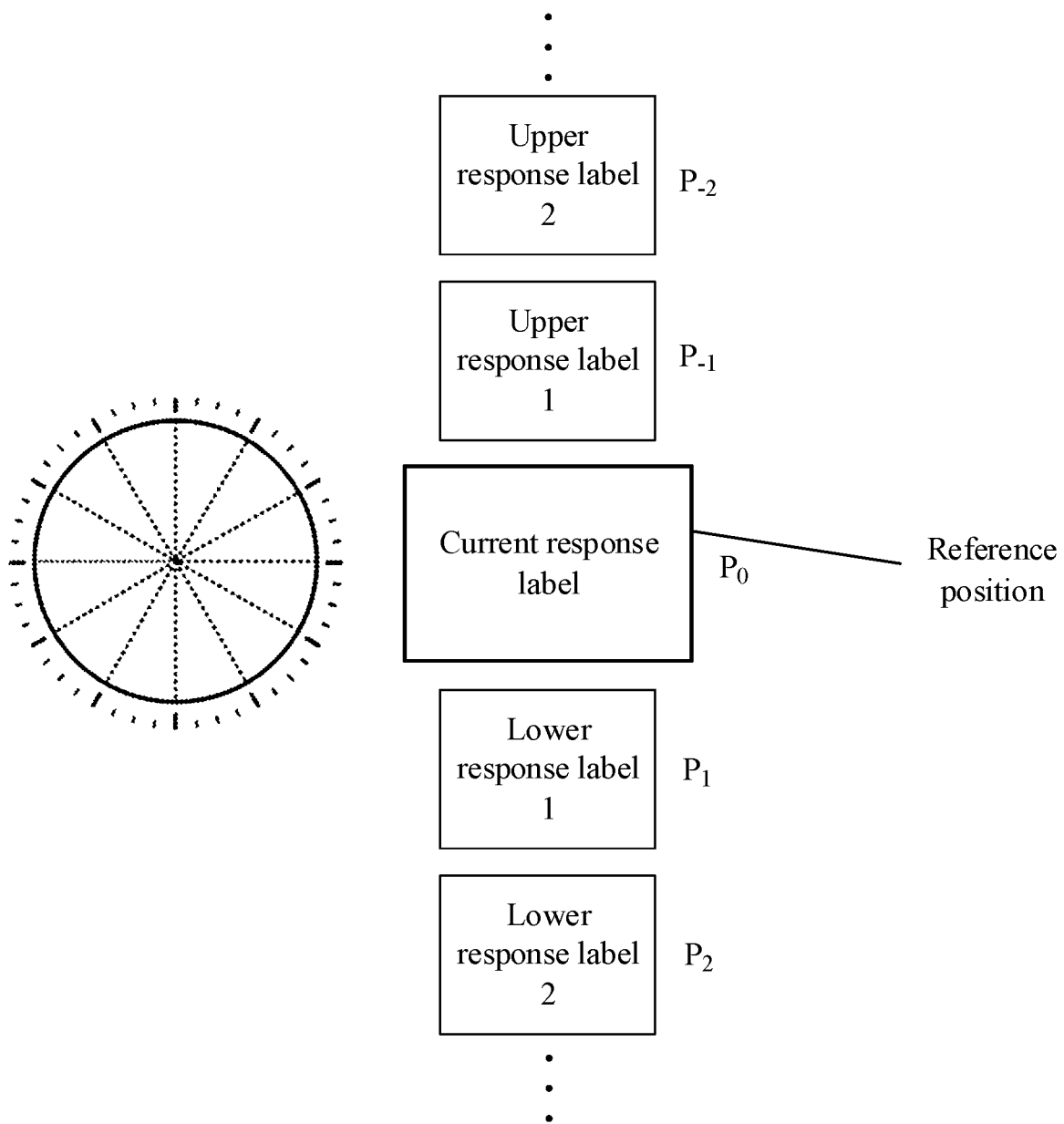
FIG. 4A is a schematic diagram of a display interface of a first touch screen according to an embodiment of the present disclosure.

As shown in FIG. 4A, an embodiment of the present disclosure provides a display interface of a touch screen. With a longitudinal arrangement that the virtual knob is positioned on the left side and the response label is positioned on the right side as an example, a circle with scales on the left side denotes the virtual knob, a square area on the right side denotes the response label, and the response label may store information specified by a developer, such as contacts in an address book, a song list of a song library, a product model, etc. The user controls the virtual knob on the left side to rotate through the touch screen, so as to make the response label on the right side move vertically to switch a position. When the virtual knob is rotated clockwise, all the response labels are moved from top to bottom to switch positions. When the virtual knob is rotated counterclockwise, all the response labels are moved from bottom to top to switch positions.

Figure 4B:
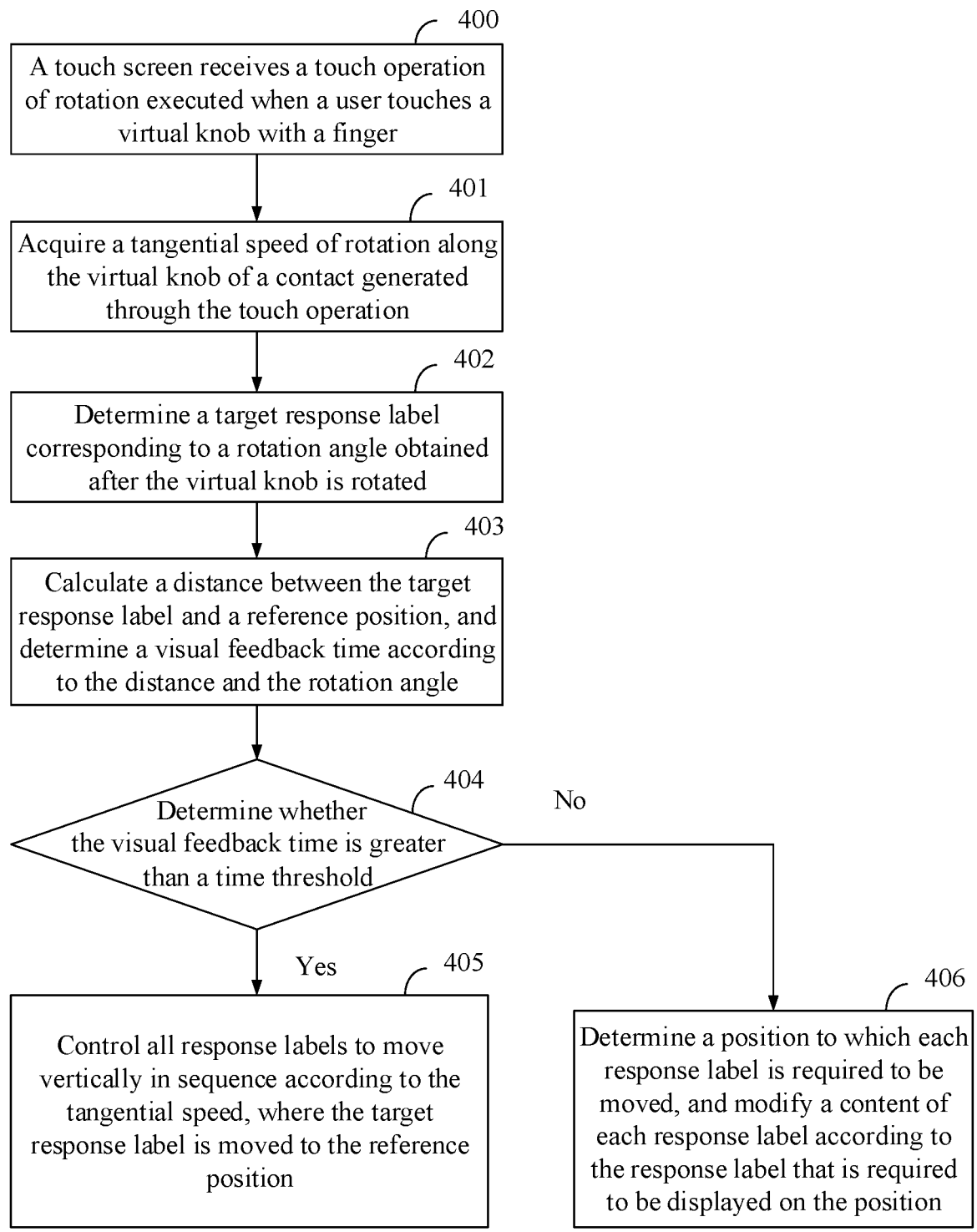
FIG. 4B is a flowchart of first human-computer interaction according to an embodiment of the present disclosure.

As shown in FIG. 4B, a human-computer interaction flow according to the present embodiment is described. A specific implementation flow is as follows.

Step 400, a touch screen receives a touch operation of rotation executed when a user touches a virtual knob with a finger.

Step 401, a tangential speed of rotation along the virtual knob of a contact generated through the touch operation is acquired.

Step 402, a target response label corresponding to a rotation angle obtained after the virtual knob is rotated is determined.

Step 403, a distance between the target response label and a reference position is calculated, and a visual feedback time is determined according to the distance and the rotation angle.

A position directly opposite the virtual knob may be set as the reference position.

Step 404, whether the visual feedback time is greater than a time threshold is determined, and if yes, step 405 is executed, otherwise step 406 is executed.

Step 405, all response labels are controlled to move vertically in sequence according to the tangential speed, where the target response label is moved to the reference position.

Step 406, a position to which each response label is required to be moved is determined, and a content of each response label is modified according to the response label that is required to be displayed on the position.

Figure 5A:
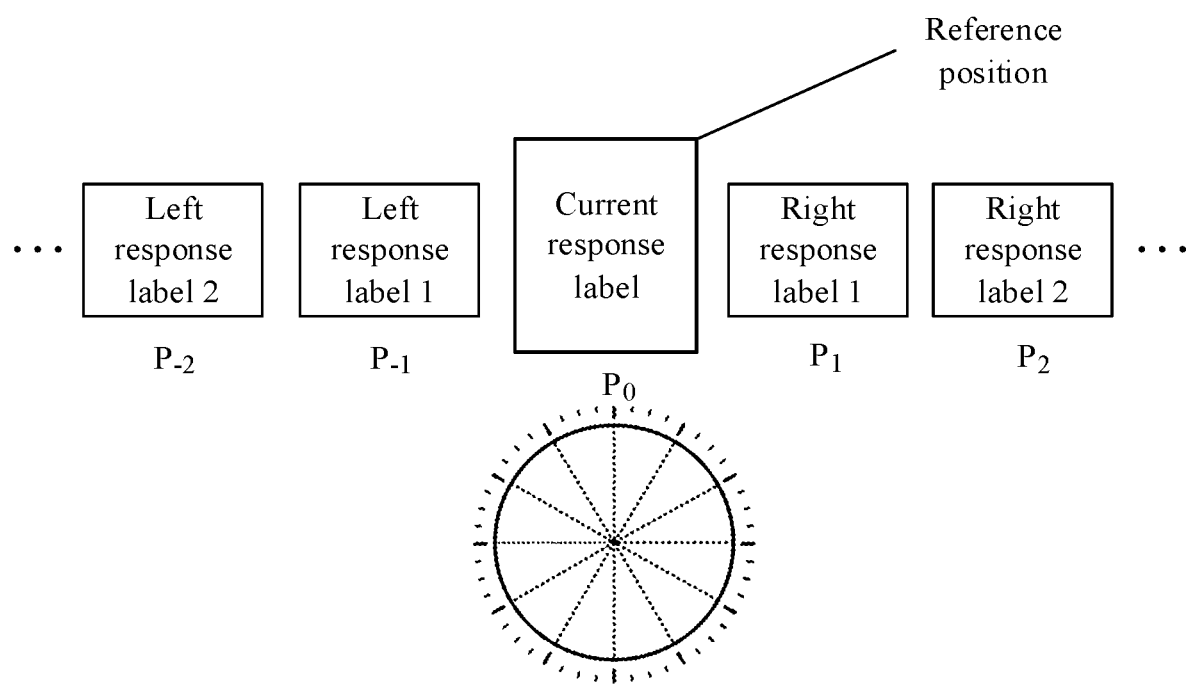
FIG. 5A is a schematic diagram of a display interface of a second touch screen according to an embodiment of the present disclosure.

As shown in FIG. 5A, an embodiment of the present disclosure provides a display interface of a touch screen. With a horizontal arrangement that the virtual knob is positioned on the lower side, and a response label is positioned on the upper side as an example, a circle with scales on the lower side denotes the virtual knob, a square area on the upper side denotes the response label, and the response label may store information specified by a developer, such as contacts in an address book, a song list of a song library, a product model, etc. The user controls the virtual knob on the lower side to rotate through the touch screen, so as to make the response label on the upper side move horizontally to switch a position. For example, when the virtual knob is rotated clockwise, all the response labels are moved from left to right to switch positions. When the virtual knob is rotated counterclockwise, all the response labels are moved from right to left to switch positions.

Figure 5B:
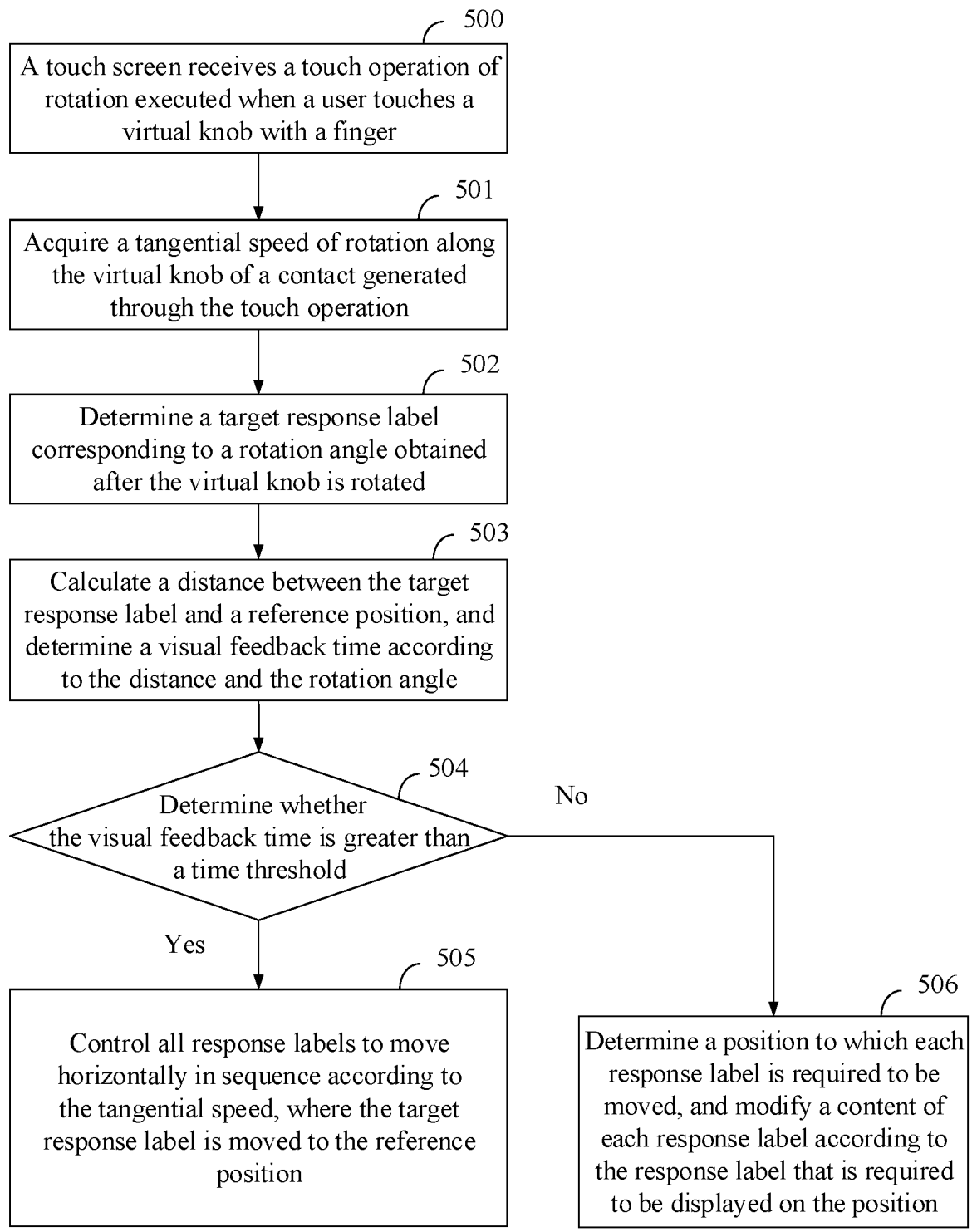
FIG. 5B is a flowchart of second human-computer interaction according to an embodiment of the present disclosure.

As shown in FIG. 5B, a human-computer interaction flow according to the present embodiment is described. A specific implementation flow is as follows.

Step 500, a touch screen receives a touch operation of rotation executed when a user touches a virtual knob with a finger.

Step 501, a tangential speed of rotation along the virtual knob of a contact generated through the touch operation is acquired.

Step 502, a target response label corresponding to a rotation angle obtained after the virtual knob is rotated is determined.

Step 503, a distance between the target response label and a reference position is calculated, and a visual feedback time is determined according to the distance and the rotation angle.

A position directly opposite the virtual knob may be set as the reference position.

Step 504, whether the visual feedback time is greater than a time threshold is determined, and if yes, step 505 is executed, otherwise step 506 is executed.

Step 505, all response labels are controlled to move horizontally in sequence according to the tangential speed, where the target response label is moved to the reference position.

Step 506, a position to which each response label is required to be moved is determined, and a content of each response label is modified according to the response label that is required to be displayed on the position.

Figure 6A:
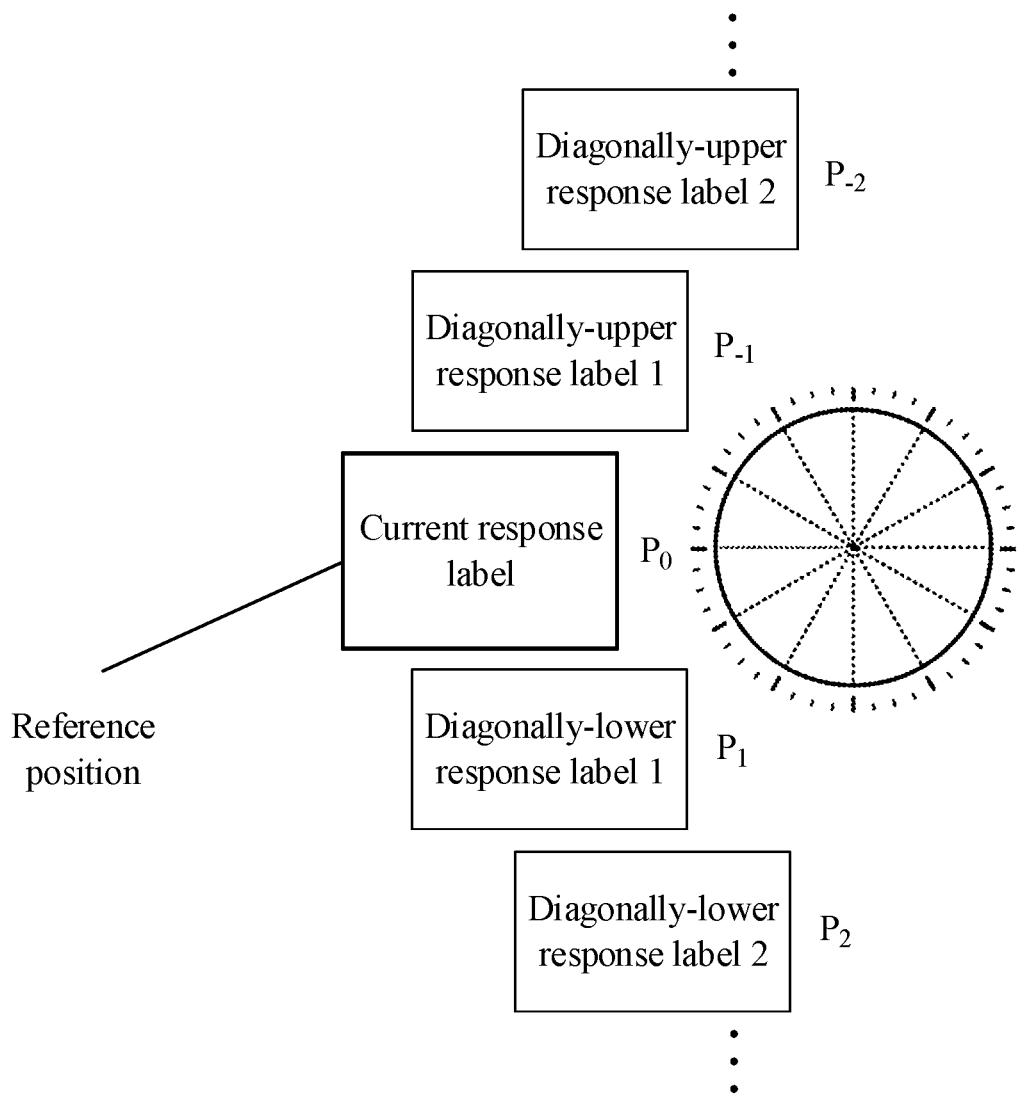
FIG. 6A is a schematic diagram of a display interface of a third touch screen according to an embodiment of the present disclosure.

As shown in FIG. 6A, an embodiment of the present disclosure provides a display interface of a touch screen. With an arrangement that the virtual knob is positioned on the left side and response labels surround the virtual knob as an example, a circle with scales on the right side denotes the virtual knob, a square area on the left side denotes the response label, and the response label may store information specified by a developer, such as contacts of an address book, a song list of a song library, a product model, etc. The user controls the virtual knob on the right side to rotate through the touch screen, so as to make the response label on the left side move diagonally to switch a position. For example, when the virtual knob is rotated clockwise, all the response labels are moved from top to bottom diagonally to switch positions. When the virtual knob is rotated counterclockwise, all the response labels are moved from bottom to top diagonally to switch positions.

Figure 6B:
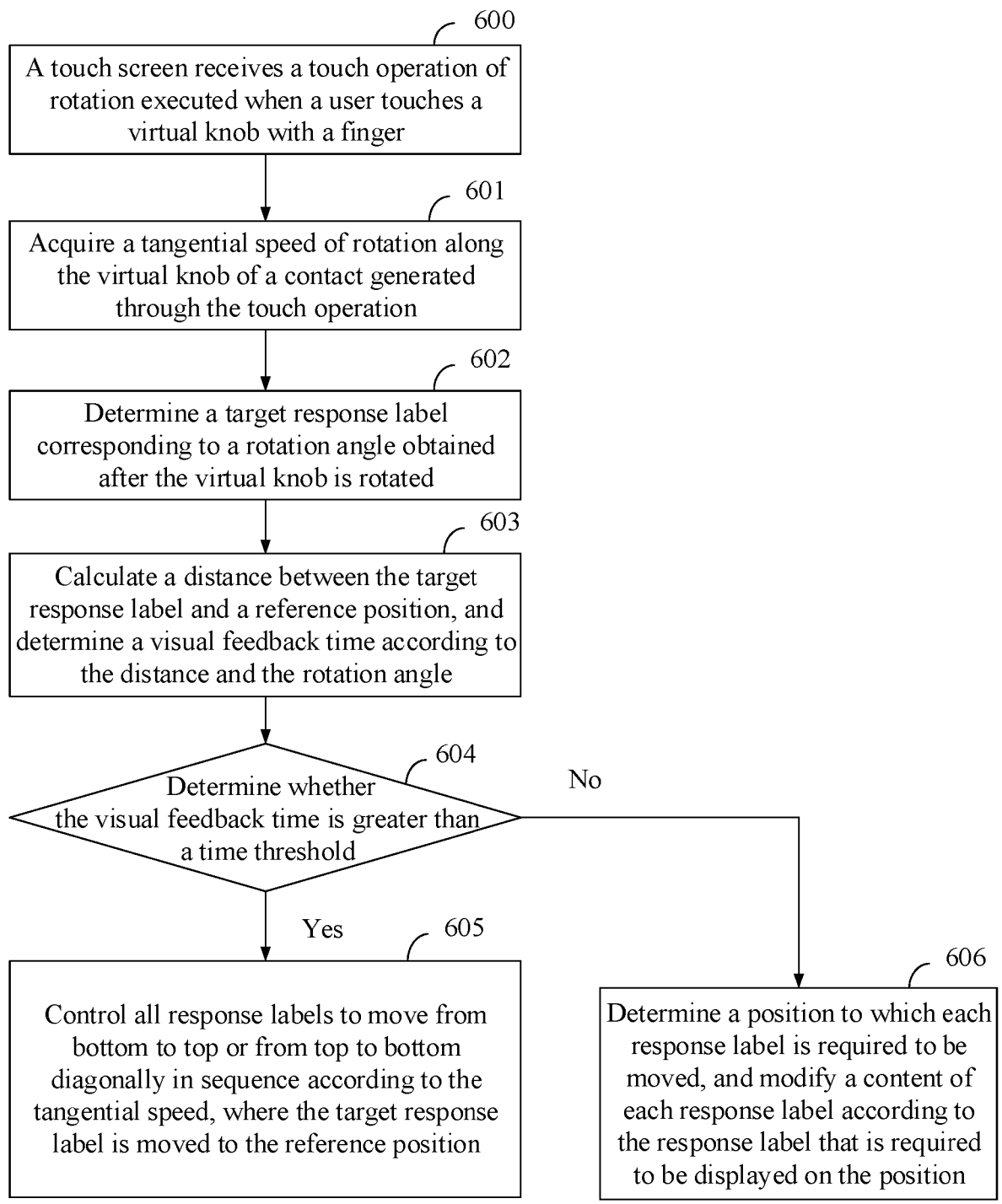
FIG. 6B is a flowchart of third human-computer interaction according to an embodiment of the present disclosure.

As shown in FIG. 6B, a human-computer interaction flow according to the present embodiment is described. A specific implementation flow is as follows.

Step 600, a touch screen receives a touch operation of rotation executed when a user touches a virtual knob with a finger.

Step 601, a tangential speed of rotation along the virtual knob of a contact generated through the touch operation is acquired.

Step 602, a target response label corresponding to a rotation angle obtained after the virtual knob is rotated is determined.

Step 603, a distance between the target response label and a reference position is calculated, and a visual feedback time is determined according to the distance and the rotation angle.

Step 604, whether the visual feedback time is greater than a time threshold is determined, and if yes, step 605 is executed, otherwise step 606 is executed.

Step 605, all response labels are controlled to move from bottom to top or from top to bottom diagonally in sequence according to the tangential speed, where the target response label is moved to the reference position.

Step 606, a position to which each response label is required to be moved is determined, and a content of each response label is modified according to the response label that is required to be displayed on the position.

During implementation, when the distance between the target response label and the reference position is small (for example, the response label to be selected by the user is adjacent to the response label currently displayed on the reference position), the user rotates the virtual knob at a low speed, and the calculated visual feedback time is generally long. Therefore, there is sufficient time for the response label to move to simulate the physical displacement in the real world. The response label on the right side may select dynamic visual feedback, that is, response label switching will cause the displacement change, and visually, the content of the response label is changed in the same mode as the physical change process in the real world. On the contrary, when the distance is large (for example, the response label to be selected by the user is spaced from the response label currently displayed on the reference position by 3 or more response labels), the user rotates the virtual knob at a high speed, and the calculated visual feedback time is generally short, even close to 0. Therefore, there is no time for the response label to move to simulate the physical displacement in the real world. The response label on the right side selects static visual feedback, that is, the content rather than the position of the response label is changed actually, and the visual feeling that the response label is moved to an exact position in one step is generated.

Embodiment 2: Based on the same inventive concept, an embodiment of the present disclosure further provides an apparatus for synchronizing haptic feedback and visual feedback. Since the apparatus is the apparatus in the method in the embodiment of the present disclosure, and the principle of solving the problem by the apparatus is similar to that of the method, reference may be made to the implementation of the method for an implementation of the apparatus, which will not be repeated herein.

Figure 7:
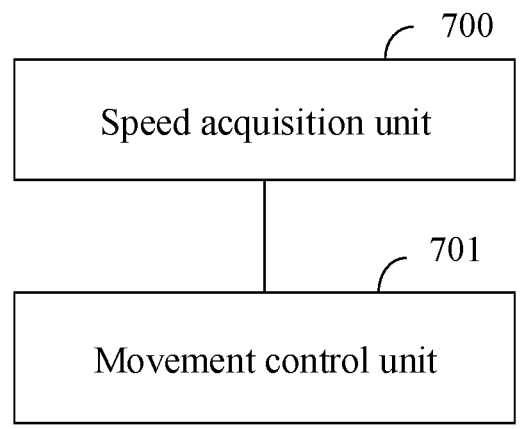
FIG. 7 is a schematic diagram of an apparatus for synchronizing haptic feedback and visual feedback according to an embodiment of the present disclosure.

As shown in FIG. 7, the apparatus includes:
a speed acquisition unit 700 configured to acquire a tangential speed of rotation of a contact, where the contact is generated when a user executes a touch operation of rotation within a coverage range of a virtual knob displayed on a touch screen, the touch operation being accompanied by haptic feedback; and
a movement control unit 701 configured to control all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

As an optional implementation mode, the apparatus further includes a content update unit configured to:
determine a visual feedback time for moving a target response label to a reference position according to the tangential speed, where the target response label is determined according to a response label displayed on the reference position before all the response labels are moved in sequence and the number of movements of each response label; and
in response to determining that the visual feedback time is less than or equal to a time threshold, update a content of each response label displayed on the touch screen.

As an optional implementation mode, the movement control unit 701 is specifically configured to:
in response to determining that the visual feedback time is greater than the time threshold, control all the response labels displayed on the touch screen to move in sequence according to the tangential speed, where the target response label is controlled to move to the reference position.

As an optional implementation mode, the content update unit is configured to:
determine the rotation angle of the virtual knob according to the tangential speed and a size of the virtual knob; and
determine the visual feedback time for moving the target response label to the reference position according to a distance between the target response label and the reference position and the rotation angle.

As an optional implementation mode, the movement control unit 701 is specifically configured to:
determine a movement track of each response label according to the step length and the number of movements of each response label; and
execute the following steps for the movement track of each response label:
perform an interpolation operation on the movement track of the response label to obtain all point positions passed by the response label in a movement process; and control the response label to move to all the point positions in sequence according to the tangential speed.

As an optional implementation mode, the movement control unit 701 is configured to:
take the tangential speed as a movement speed to control all the response labels displayed on the touch screen to move in sequence at a uniform speed.

As an optional implementation mode, the movement control unit 701 is configured to:
acquiring a rotation direction of the contact, and determine a movement direction of each response label displayed on the touch screen according to the rotation direction; and
control all the response labels displayed on the touch screen to move in sequence according to the tangential speed and the movement direction.

As an optional implementation mode, all the response labels are arranged and displayed in sequence in a longitudinal direction; alternatively, all the response labels are arranged and displayed in sequence in a horizontal direction; and alternatively, all the response labels are arranged and displayed around the virtual knob.

Embodiment 3: based on the same inventive concept, an embodiment of the present disclosure further provides a device for synchronizing haptic feedback and visual feedback. Since the device is the device in the method in the embodiment of the present disclosure, and the principle of solving the problem by the device is similar to that of the method, reference may be made to the implementation of the method for an implementation of the device, which will not be repeated herein.

Figure 8:
FIG. 8 is a schematic diagram of a device for synchronizing haptic feedback and visual feedback according to an embodiment of the present disclosure.

As shown in FIG. 8, the device includes a processor 800 and a memory 801, where the memory 801 is configured to storing a program executable by the processor 800, and the processor 800 is configured to reading the program from the memory 801 and executing the following steps:

acquiring a tangential speed of rotation of a contact, where the contact is generated when a user executes a touch operation of rotation within a coverage range of a virtual knob displayed on a touch screen, the touch operation being accompanied by haptic feedback; and controlling all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

As an optional implementation mode, the processor 800 is further configured to perform followings:

determining a visual feedback time for moving a target response label to a reference position according to the tangential speed, where the target response label is determined according to a response label displayed on the reference position before all the response labels are moved in sequence and the number of movements of each response label; and in response to determining that the visual feedback time is less than or equal to a time threshold, updating a content of each response label displayed on the touch screen.

As an optional implementation mode, the processor 800 is configured to perform followings:

in response to determining that the visual feedback time is greater than the time threshold, controlling all the response labels displayed on the touch screen to move in sequence according to the tangential speed, where the target response label is controlled to move to the reference position.

As an optional implementation mode, the processor 800 is configured to perform followings:

determining the rotation angle of the virtual knob according to the tangential speed and a size of the virtual knob; and determining the visual feedback time for moving the target response label to the reference position according to a distance between the target response label and the reference position and the rotation angle.

As an optional implementation mode, the processor 800 is specifically configured to perform followings:

determining a movement track of each response label according to the step length and the number of movements of each response label; and executing the following steps for the movement track of each response label:

performing an interpolation operation on the movement track of the response label to obtain all point positions passed by the response label in a movement process; and control the response label to move to all the point positions in sequence according to the tangential speed.

As an optional implementation mode, the processor 800 is configured to perform followings:

taking the tangential speed as a movement speed to control all the response labels displayed on the touch screen to move in sequence at a uniform speed.

As an optional implementation mode, the processor 800 is configured to perform followings:

acquiring a rotation direction of the contact, and determining a movement direction of each response label displayed on the touch screen according to the rotation direction; and controlling all the response labels displayed on the touch screen to move in sequence according to the tangential speed and the movement direction.

As an optional implementation mode, all the response labels are arranged and displayed in sequence in a longitudinal direction; alternatively, all the response labels are arranged and displayed in sequence in a horizontal direction; and alternatively, all the response labels are arranged and displayed around the virtual knob.

Based on the same inventive concept, an embodiment of the present disclosure further provides a computer storage medium, storing a computer program, where when executed by a processor, the program is configured to perform followings:

acquiring a tangential speed of rotation of a contact, where the contact is generated when a user executes a touch operation of rotation within a coverage range of a virtual knob displayed on a touch screen, the touch operation being accompanied by haptic feedback; and controlling all response labels displayed on the touch screen to move in sequence according to the tangential speed, so as to synchronize the haptic feedback and visual feedback formed by moving each response label, where a step length of each movement of each response label corresponds to a preset unit angle, and the number of movements of each response label is determined according to the number of preset unit angles encompassed in a rotation angle of the virtual knob.

Those skilled in the art should understand that the embodiments of the present disclosure can be provided as methods, systems, or computer program products. Therefore, the present disclosure can employ full hardware embodiments, full software embodiments, or software and hardware combined embodiments. Moreover, the present disclosure can take the form of a computer program product that is implemented on one or more computer available storage media (including, but not limited to, a magnetic disk memory, optical memory, etc.) that encompass computer available program codes.

The present disclosure is described with reference to flow charts and/or block diagrams of the methods, devices (systems), and computer program products according to the embodiments of the present disclosure. It should be understood that each flow and/or block in the flowcharts and/or block diagrams and combinations of the flows and/or blocks in the flowcharts and/or block diagrams can be implemented through computer program instructions. The computer program instructions can be provided for a processor of a general-purpose computer, a special-purpose computer, an embedded processor, or other programmable data processing devices, to produce a machine, so that instructions executed by the processor of the computer or other programmable data processing devices produce a device configured to implementing functions specified in one or more flows in the flowcharts and/or one or more blocks in the block diagrams.

The computer program instructions can also be stored in a computer-readable memory that is capable of guiding a computer or other programmable data processing devices to work in a specific mode, so that the instructions stored in the computer-readable memory produce an article of manufacture including an instruction device, and the instruction device implements functions specified in one or more flows in the flowcharts and/or one or more blocks in the block diagrams.

The computer program instructions can also be loaded onto the computer or other programmable data processing devices, so that a series of operations and steps are executed on the computer or other programmable devices, thereby generating computer-implemented processing. Therefore, the instructions executed on the computer or other programmable devices provide steps for implementing functions specified in one or more flows in the flowcharts and/or one or more blocks in the block diagrams.

Obviously, those skilled in the art can make various amendments and variations to the present disclosure without departing from the spirit and scope of the present disclosure. In this way, it is intended that the present disclosure also encompasses these amendments and variations if the amendments and variations to the present disclosure fall within the scope of the claims of the present disclosure and the equivalents thereof.

What is claimed is:

1. A method for synchronizing haptic feedback and visual feedback, comprising:
   acquiring a tangential speed of rotation of a contact, wherein the contact is generated in response to a user performing a touch operation of rotation within a coverage range of a virtual knob displayed on a touch screen, the touch operation being accompanied by haptic feedback; and
   controlling response labels displayed on the touch screen to move in sequence according to the tangential speed, so as to synchronize the haptic feedback and a visual feedback formed by moving each of the response labels, wherein a step length of a movement of each of the response labels corresponds to a preset unit angle, and a quantity of movements of each of the response labels is determined according to a quantity of preset unit angles encompassed in a rotation angle of the virtual knob;
   wherein the controlling the response labels displayed on the touch screen to move in sequence according to the tangential speed, comprises:
   determining a movement track of each of the response labels according to the step length and the quantity of movements of each of the response labels; and
   performing following steps for the movement track of each of the response labels:
   performing an interpolation operation on the movement track of each of the response labels to obtain point positions passed by each of the response labels in a movement process;
   and controlling each of the response labels to move to the point positions in sequence according to the tangential speed.

2. The method according to claim 1, further comprising:
   determining a visual feedback time for moving a target response label to a reference position according to the tangential speed, wherein the target response label is determined according to a response label displayed on the reference position before the response labels are moved in sequence and according to the quantity of movements of each of the response labels; and
   in response to the visual feedback time being less than or equal to a time threshold, directly updating a content of each of the response labels displayed on the touch screen within the time threshold, wherein a content of a response label displayed at the reference position after the updating is a content of the target response label, and an order of the response labels is not changed after the updating.

3. The method according to claim 2, wherein the controlling the response labels displayed on the touch screen to move in sequence according to the tangential speed, comprises:
   in response to the visual feedback time being greater than the time threshold, controlling the response labels displayed on the touch screen to move in sequence according to the tangential speed, wherein the target response label is controlled to move to the reference position.

4. The method according to claim 2, wherein the determining a visual feedback time for moving a target response label to a reference position according to the tangential speed, comprises:
   determining the rotation angle of the virtual knob according to the tangential speed and a size of the virtual knob; and
   determining the visual feedback time for moving the target response label to the reference position according to a distance between the target response label and the reference position and the rotation angle.

5. The method according to claim 1, wherein the controlling the response labels displayed on the touch screen to move in sequence according to the tangential speed, comprises:
   taking the tangential speed as a movement speed to control the response labels displayed on the touch screen to move in sequence at a uniform speed.

6. The method according to claim 1, wherein the controlling the response labels displayed on the touch screen to move in sequence according to the tangential speed, comprises:
   acquiring a rotation direction of the contact, and determining a movement direction of each of the response labels displayed on the touch screen according to the rotation direction; and
   controlling the response labels displayed on the touch screen to move in sequence according to the tangential speed and the movement direction.

7. The method according to claim 1, wherein
   the response labels are arranged and displayed in sequence in a longitudinal direction; or,
   the response labels are arranged and displayed in sequence in a horizontal direction; and or,
   the response labels are arranged and displayed around the virtual knob.

8. A device for synchronizing haptic feedback and visual feedback, comprising: a processor and a memory, wherein the memory is configured to store a program executable by the processor, and the processor is configured to read the program from the memory and implement followings:
   acquiring a tangential speed of rotation of a contact, wherein the contact is generated in response to a user performing a touch operation of rotation within a coverage range of a virtual knob displayed on a touch screen, the touch operation being accompanied by haptic feedback; and
   controlling response labels displayed on the touch screen to move in sequence according to the tangential speed, so as to synchronize the haptic feedback and a visual feedback formed by moving each of the response labels, wherein a step length of a movement of each of the response labels corresponds to a preset unit angle, and a quantity of movements of each of the response labels is determined according to a quantity of preset unit angles encompassed in a rotation angle of the virtual knob;

wherein the processor is further configured to read the program from the memory and implement followings:

determining a movement track of each of the response labels according to the step length and the quantity of movements of each of the response labels; and performing following steps for the movement track of each of the response labels:

performing an interpolation operation on the movement track of each of the response labels to obtain point positions passed by each of the response labels in a movement process;

and controlling each of the response labels to move to the point positions in sequence according to the tangential speed.

9. A non-transitory computer storage medium, storing a computer program, wherein the program implements steps of the method according to claim 1 when executed by a processor.

10. The device according to claim 8, wherein the processor is configured to read the program from the memory and implement followings:

determining a visual feedback time for moving a target response label to a reference position according to the tangential speed, wherein the target response label is determined according to a response label displayed on the reference position before the response labels are moved in sequence and according to the quantity of movements of each of the response labels; and in response to the visual feedback time being less than or equal to a time threshold, updating a content of each of the response labels displayed on the touch screen.

11. The device according to claim 10, wherein the processor is configured to read the program from the memory and implement followings:

in response to the visual feedback time being greater than the time threshold, controlling the response labels displayed on the touch screen to move in sequence according to the tangential speed, wherein the target response label is controlled to move to the reference position.

12. The device according to claim 10, wherein the processor is configured to read the program from the memory and implement followings:

determining the rotation angle of the virtual knob according to the tangential speed and a size of the virtual knob; and determining the visual feedback time for moving the target response label to the reference position according to a distance between the target response label and the reference position and the rotation angle.

13. The device according to claim 8, wherein the processor is configured to read the program from the memory and implement followings:

taking the tangential speed as a movement speed to control the response labels displayed on the touch screen to move in sequence at a uniform speed.

14. The device according to claim 8, wherein the processor is configured to read the program from the memory and implement followings:

acquiring a rotation direction of the contact, and determining a movement direction of each of the response labels displayed on the touch screen according to the rotation direction; and controlling the response labels displayed on the touch screen to move in sequence according to the tangential speed and the movement direction.

15. The device according to claim 8, wherein the response labels are arranged and displayed in sequence in a longitudinal direction; or, the response labels are arranged and displayed in sequence in a horizontal direction; and or, the response labels are arranged and displayed around the virtual knob.

\* \* \* \* \*